(12) United States Patent  (10) Patent No.: US 8,987,925 B2
McCarthy  (45) Date of Patent: Mar. 24, 2015

(54) SELF-CONTAINED UNDERGROUND POWER PLANT

(71) Applicant: Walton W. McCarthy, Forney, TX (US)

(72) Inventor: Walton W. McCarthy, Forney, TX (US)

( * ) Notice: Subject to any disclaimer, the term of this patent is extended or adjusted under 35 U.S.C. 154(b) by 41 days.

(21) Appl. No.: 13/887,999

(22) Filed: May 6, 2013

(65) Prior Publication Data

US 2014/0327246 A1 Nov. 6, 2014

(51) Int. Cl.
F02B 63/04 (2006.01)
F03G 7/08 (2006.01)
H02K 7/18 (2006.01)
H02K 99/00 (2014.01)

(52) U.S. Cl.
CPC ................................. *H02K 57/003* (2013.01)
USPC .......................................... 290/1 R; 290/1 B

(58) Field of Classification Search
CPC ............... Y02E 10/726; F05B 2240/14; F05B 2240/9112; F05B 2240/932; E02D 27/32; H01H 3/26; H02G 9/06
USPC ................ 290/43, 44, 54, 55; 166/65.1, 66.4, 166/66.5; 175/57, 93, 107, 320
See application file for complete search history.

(56) References Cited

U.S. PATENT DOCUMENTS

| 3,939,356 | A | * | 2/1976 | Loane | 290/52 |
|---|---|---|---|---|---|
| 4,345,974 | A | * | 8/1982 | McCarthy | 203/19 |
| 4,440,861 | A | * | 4/1984 | McCarthy | 435/289.1 |
| 4,660,334 | A | * | 4/1987 | McCarthy | 52/169.6 |
| 5,007,244 | A | * | 4/1991 | Mori | 62/53.1 |
| 6,296,693 | B1 | * | 10/2001 | McCarthy | 96/117.5 |
| 6,438,907 | B1 | * | 8/2002 | McCarthy | 52/169.6 |
| 7,642,665 | B2 | * | 1/2010 | Konop et al. | 290/1 A |
| 7,886,669 | B2 | * | 2/2011 | Kumar | 105/26.05 |
| 2002/0023762 | A1 | * | 2/2002 | Kotliar | 169/54 |
| 2002/0046515 | A1 | * | 4/2002 | McCarthy | 52/169.6 |
| 2002/0124490 | A1 | * | 9/2002 | McCarthy | 52/169.6 |
| 2008/0141864 | A1 | * | 6/2008 | McCarthy | 96/224 |
| 2011/0088339 | A1 | * | 4/2011 | McCarthy | 52/169.6 |
| 2011/0147289 | A1 | * | 6/2011 | Kortmann | 210/170.09 |
| 2012/0068466 | A1 | * | 3/2012 | Gilbert | 290/55 |

* cited by examiner

*Primary Examiner* — Tulsidas C Patel
*Assistant Examiner* — Charles Reid, Jr.
(74) *Attorney, Agent, or Firm* — Michael J. Persson; Catherine E. Napjus; Lawson Persson & Weldon-Francke

(57) ABSTRACT

The present invention is a self-contained, EMP shielded underground power plant. The power plant includes a housing with a round aluminum cover, a round gravity dish bottom, a carbon steel, cylindrical side connecting the cover and the bottom, and eight turnbuckles for securing the cover to the side. A generator, a battery bank, and an inverter charger that charges the battery bank are disposed within the housing. The power plant also includes air inlet and outlet manifolds baffled and covered with copper screens. The air inlet manifold includes an air filter. Exhaust air and cooling air leaving the generator are forced out of the housing through the air outlet manifold.

4 Claims, 1 Drawing Sheet

SELF-CONTAINED UNDERGROUND POWER PLANT

FIELD OF THE INVENTION

The present invention relates to power generators, and in particular, to underground power generators resilient against natural and manmade disasters.

BACKGROUND

The need for power generation independent of the electrical grid is well known. This need may be due to failure of the electrical grid, a remote location where power is needed, but there is no access to the grid, or a desire not to be connected to the electrical grid. Having a redundant power source as a prophylactic measure against failure of the electrical grid is the most common reason for businesses, individuals, or other entities to install generators. The conventional generator is above ground and subject to flying debris, flooding, and damage due to building collapse. In addition, such a generator is completely vulnerable to electrical overload from an electromagnetic pulse (EMP). Therefore there is a need for a generator that can withstand natural and manmade disasters, including EMPs.

SUMMARY OF THE INVENTION

The present invention is a self-contained underground power plant and kit.

In its most basic form, the power plant includes a housing, a generator disposed within the housing, and air inlet and outlet manifolds. The housing has a cover with a manway for a person to get in and out of the power plant, a bottom, a side connecting the cover and the bottom, and an interior. The air inlet and outlet manifolds allow fresh air to come into the interior of the housing, and exhaust and other undesirable air to leave the interior of the housing, respectively.

The preferred generator is a 5.5 kW LP 2400 RPM generator, but larger models may produce up to 20 kW of power.

The preferred housing is round so that the side is cylindrical, although other shapes may be substituted. The cover is preferably made of aluminum, which is four times more conductive than steel, and the side and bottom are preferably made of carbon steel. The housing is therefore an excellent Faraday cage for protection against EMPs. The housing may also be made of any other material that forms a Faraday cage, such as aluminum or copper. In addition, each of the air inlet and outlet manifolds are preferably baffled and covered with 16 mesh copper screens, or honeycomb EMP vents that shield across the entire range of EMP frequencies 100 Hz to 10 Ghz as a further EMP shield. The air inlet and outlet manifolds are also preferably sloped so as to prevent damage from flying debris, such as may occur during tornadoes. The entire cover of the housing may be removed for installation of the interior components, but is held in place by at least four, and preferably eight turnbuckles during normal operation. One of ordinary skill in the art will recognize that the securing the cover with turnbuckles is exemplary, and any means commonly used in the art for securing the cover in place once the generator has been installed within may be substituted for the turnbuckles.

The manway included in the housing cover is preferably a round cover with a 24" diameter, which is connected by 10 hex bolts. The cover for the manway is preferably secured to housing cover by two padlocks. Again, one of ordinary skill in the art will recognize that the manway cover may connected and secured by any means commonly used in the art.

The bottom of the housing is preferably a gravity dish, which provides downward gravity force to counteract the upward buoyancy force that may be created by displaced water if the power plant is installed where the water table reaches ground level.

The preferred housing has a diameter of between 8' and 9', and is preferably 8'6". The preferred interior of the housing has a diameter of between 5'6" and 6'6", and preferably 6'. The preferred total height of the housing including the curved gravity dish bottom is between 4'6" and 5'6", and preferably 1.5 m.

The air inlet manifold preferably includes an air filter. This keeps the interior of the housing clean and dust and other small debris out of the generator, which also preferably includes its own air filter. The housing also preferably includes a centrifugal air blower, which supplies cooling and combustion air to the generator. Exhaust air and cooling air leaving the generator is forced through the air outlet manifold so that no exhaust or hot air are exhausted into the interior of the housing.

The preferred power plant also includes a battery bank of six 140 AH AGM batteries and an inverter charger. The preferred power plant including a battery bank also preferably includes a floor above the bottom of the housing, where the generator is disposed upon the floor and the battery bank is disposed beneath the floor. The preferred inverter charger is a 2800 W inverter/125 A battery charger. AC power is supplied from the inverter and the battery bank, the result being that the generator usually operates about 12-16 hours per day. The generator preferably automatically turns on when the battery voltage drops to 12.5 V. In some embodiments, photovoltaic panels are included on the cover of the power plant or in near proximity to the power plant, and a solar charge controller is included in the interior. The photovoltaic panels provide supplemental power during daylight hours, assuming the panels access to sunlight is not obstructed.

The preferred power plant also includes a power outlet cable, a control cable, and a propane supply cable extending away from the power plant. The power outlet cable sends the power generated from the power plant and must be connected on its other end to the power recipient. The control cable allows the various components of the power plant to be controlled remotely, or at least from above ground. The propane supply cable is connected on its other end to a propane supply, which supplies propane to the generator within the power plant.

If the power plant is intended to be used after an EMP attack, the conventional load transfer panel cannot be used. Instead, the incoming grid power line to the house or other power recipient must have a female plug on it and the load distribution panel must have a male plug. The incoming power from the power plant must also have a female plug. After a disaster, the load distribution panel is unplugged from the grid power and plugged into the power plant plug.

In its most basic form, the power plant kit of the present invention includes a power plant as described above, and a propane supply. The propane supply is preferably an underground propane tank, which may be any size, but is preferably a standard-sized tank. The propane supply is connected to the generator through the housing of the power plant by the propane supply line.

To accommodate the preferred power plant, a 9'×9'×5' deep hole must be excavated. This hole needs to be backfilled with 8 yards of pea stone or screened earth. The preferred power plant kit also includes one or more sacrificial anodes placed in the bottom of the hole as a part of the anti-corrosion process. Installation of the power plant kit, including the power plant itself and the propane tank takes approximately one day.

Therefore it is an aspect of the present invention to provide a self-contained underground power plant resilient against above ground damage.

It is a further aspect of the present invention to provide a power plant kit including a self-contained underground power plant installed with a propane supply.

These aspects of the present invention are not meant to be exclusive and other features, aspects, and advantages of the present invention will be readily apparent to those of ordinary skill in the art when read in conjunction with the following description and accompanying drawings.

DETAILED DESCRIPTION

Figure 1A:
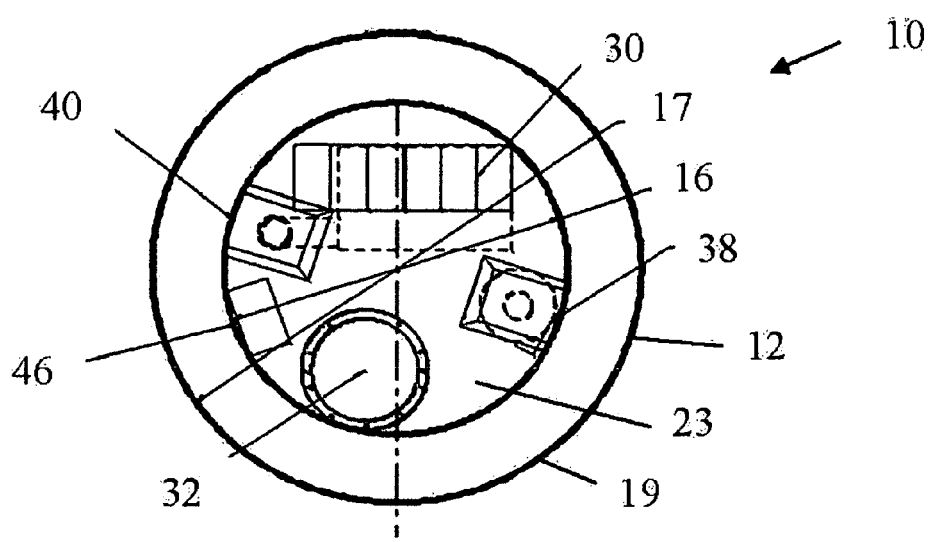
FIG. 1A is a top down cutaway view of the power plant of the present invention without its cover.
Figure 1B:
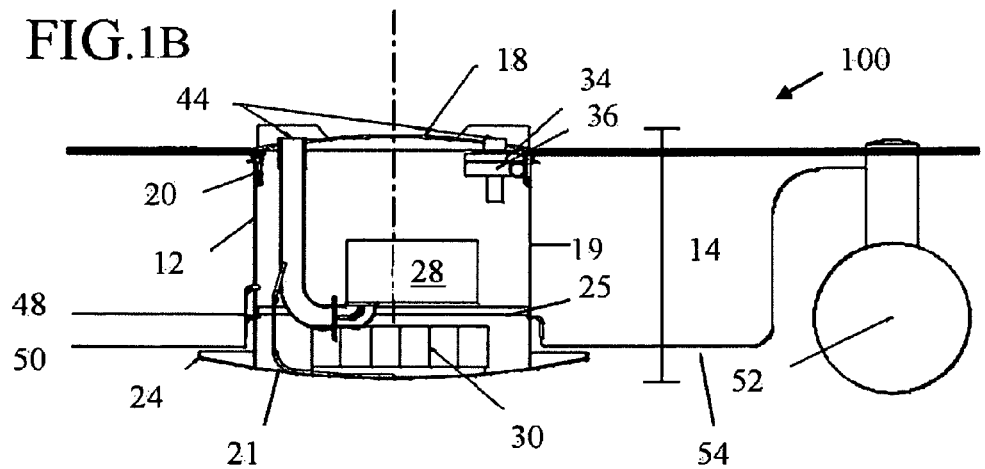
FIG. 1B is a side cutaway view of the power plant kit of the present invention.

Now referring to FIGS. 1A and 1B, a top down cutaway view of the power plant 10 without cover 18, and a side cutaway view of the power plant kit 100 are provided, respectively.

FIG. 1A shows the preferred round shape of housing 12. The outer diameter 17 spans across side 19, and is 8'6". The inner diameter 16 of the interior 23 of the housing 12 is 6'. The manway 32 is shown where a person can get in and out of the interior 23. The manway 32 is 2' in diameter, and is connected by 10 hex bolts. The power plant 10 includes air inlet and outlet manifolds 38, 40. Dashed lines show where generator 28 is disposed above battery bank 30 and the connection between generator 28 and air outlet manifold 40.

Generator 28 is a 5.5 kW LP 2400 ROM generator. The generator set was designed and manufactured in facilities certified to ISO 9001. The engine is a 5.5 kW, 4-cycle, 3 cylinder air-cooled diesel engine with 2400 rpm, a permanent magnet alternator, pure sine wave output, digital voltage regulation with no adjustments required, a USDA-approved spark arrestor, a sound insulated cover with cooling air inlet and outlet ducts, a heavy-duty air cleaner, a maintenance free electronic governor, fused DC circuits, overvoltage protection, a low oil pressure warning, over-temp protection, over speed and overload safeties, bulkhead-type connections for fuel and battery, terminal block connection for AC output, full flow oil and fuel filter, service and maintenance from bottom, automatic timed glow plugs for a quick and easy start, an hour meter, 03. to 0.6 gph LP fuel consumption, and meets applicable U.S. Environmental Protection Agency and California emissions standards. The alternator is preferably a brushless Class H Cummins Onan brand permanent magnet with frequency regulation +/−0.1%, no exciter system, and no bearings. Generator 28 has been field tested to extremes of temperature between −29° C. and 49° C. for starting and operations. Generator 28 has been tested for use with RV loads, air conditioners, microwaves, converters, and televisions, as well as in high humidity conditions, salt spray conditions, and heavy airborne dust conditions. Generator 28 models that are 60 Hz (or 120 V) are listed by the SGS United States Testing Company, Inc. per ANSI/RVIA EGS-1, and are certified per Electrical Bulletin 946.

Battery bank 30 includes six 140 AH AGM batteries and is charged by inverter charger 46. Inverter charger 46 is a 2800 W inverter/125 A battery charger. AC power is supplied from the inverter charger 46 and the battery bank 30, the result being that the generator 28 usually operates about 12-16 hours per day. The generator 28 automatically turns on when the battery voltage drops to 12.5 V.

As shown more clearly in FIG. 1B, exhaust and cooling air from generator 28 are forced out of air outlet manifold 40 so that they are not introduced into the main interior 23 space. Air inlet manifold 38 includes air filter 34 and centrifugal air blower 36. The air entering interior 23 passes through air filter 34 to keep the interior 23 clean and to keep dust from entering the generator 28, which also has a filter. A slow speed propane generator, such as the generator 28 shown, can operate in a controlled and filtered air environment for thousands of hours.

The cover 18 is made of aluminum, which is four times more conductive than steel, and side 19 is preferably made of carbon steel. The housing 12 is therefore an excellent Faraday cage for protection against EMPs. In addition, each of the air inlet and outlet manifolds 38, 40 are baffled and covered with 16 mesh copper screens 44, and/or ⅛ honeycomb vents, as a further EMP shield. The air inlet and outlet manifolds 38, 40 are also sloped so as to prevent damage from flying debris, such as may occur during tornadoes. The entire cover 18 of the housing 12 may be removed for installation of the components within, but is held in place by eight turnbuckles 20 during normal operation.

The bottom 21 of the housing 12 is a gravity dish 24. The gravity dish 24 allows the power plant 10 to remain constrained within the ground, even in areas where the water table reaches ground level. Therefore even if the ground is completely saturated with water, there is no need for tie downs with the inclusion of the gravity dish 24. In such circumstances, the preferred power plant 10, as shown, displaces water, creating 7,363 pounds of hydrostatic or upward "buoyancy" force. The gravity dish 24 generates downward "gravity" force or "counter hydrostatic pressure" based on submerged earth at 70 pound/ft$^3$ which is an industry standard for submerged earth. The industry standard is that the gravity force should be a minimum of 1.2 times the hydrostatic or buoyancy pressure. The gravity dish 24 used with the preferred power plant 10 creates 8,890 pounds of gravity of counter-buoyancy. This positive gravity force allows power plant 10 to be restrained underground without the need for additional restraining measures. Such restraining measures, such as cable or other tie downs, would create localized stress on power plant 10, which could damage the structure during ground shock from heavy traffic or earthquakes. Conversely, the gravity dish 24 creates uniform stresses around power plant 10, effectively eliminating local stresses. The total height 14 of housing 12 including the bottom of the curved gravity dish 24 is between 4'6" and 5'6", and is preferably 1.5 m.

Power plant 10 includes floor 25 above bottom 21. Generator 28 is disposed upon floor 25 and battery bank 30 is disposed below it. Power plant 10 also includes a power outlet cable 50, a control cable 48, and a propane supply hose 54 extending away from the power plant 10. The power outlet cable 50 sends the power generated from the power plant and must be connected on its other end to the power recipient. The control cable 48 allows the various components of power plant 10 to be controlled remotely, or at least from above ground. The propane supply cable 54 is connected on its other end to propane tank 52, which supplies propane to the generator 28. Propane tank 52, may be any size, but is preferably a standard 500 gallon, 1,000 gallon, 3,000 gallon, or 5,000 gallon tank. To run the preferred 5.5 kW generator for 16 hours/day at 50% load, a power plant kit 100 including a 500 gallon tank would provide 31 days of power; a 1,000 gallon tank, 62 days; a 3,000 gallon tank, 93 days; and a 5,000 gallon tank 312 days. These numbers are based on 50% load.

To accommodate the power plant 10 shown, a 9'×9'×5' deep hole must be excavated. This hole needs to be backfilled with 8 yards of pea stone or screened earth. The power plant kit 100 also includes one or more sacrificial anodes (not shown) placed in the bottom of the hole as a part of the cathodic protection or anti-corrosion process. Installation of the power plant kit 100, including the power plant 10 itself and the propane tank 52 takes approximately one day.

Although the present invention has been described in considerable detail with reference to certain preferred versions thereof, other versions would be readily apparent to those of ordinary skill in the art. Therefore, the spirit and scope of the description should not be limited to the description of the preferred versions contained herein.

What is claimed is:

1. A self-contained power plant for use underground, comprising:
    a housing comprising:
        a round housing cover comprising a manway cover, wherein said manway cover is sized and dimensioned to allow ingress and egress of a person, wherein said housing cover is made of one of a group consisting of aluminum, copper, and carbon steel;
        a round gravity dish bottom, wherein said bottom is made of one of a group consisting of aluminum, copper, and carbon steel;
    a cylindrical side connecting said housing cover and said bottom, wherein said side is made of one of a group consisting of aluminum, copper, and carbon steel;
    an outer diameter of 8 feet, 6 inches;
    a height of 1.5 meters;
    eight turnbuckles for securing said cover of said housing to said side of said housing; and
        an interior comprising an inner diameter of 6 feet;
    a floor disposed above said bottom of said housing, within said interior of said housing;
    a generator housed within said interior of said housing and disposed upon said floor, capable of producing 5.5 kW, and capable of starting and operating in temperatures as low as -29° C. and as high as 49° C.;
    an air blower in communication with said generator such that said air blower supplies cooling and combustion air to said generator;
    a battery bank housed within said interior of said housing and disposed below said floor, comprising 6 140 AH AGM batteries;
    an inverter charger in electric communication with said battery bank such that said inverter charger charges said battery bank, and wherein said inverter charger is a 2800 W inverter and a 125 A battery charger;
    a sloped air inlet manifold comprising an air filter;
    a sloped air outlet manifold, wherein exhaust air and cooling air leaving said generator are forced out of said housing through said air outlet manifold, and wherein each of said air inlet manifold and said air outlet manifold are baffled and covered with a copper screen; and
    a control cable, a power outlet cable, and a propane supply line extending from said housing.

2. A self-contained power plant kit for use underground, comprising:
    a self-contained power plant, comprising:
    a housing comprising:
        a round housing cover comprising a manway cover, wherein said manway cover is sized and dimensioned to allows ingress and egress of a person, and wherein said housing cover is made of one of a group consisting of aluminum, copper, and carbon steel;
        a round gravity dish bottom, wherein said bottom is made of one of a group consisting of aluminum, copper, and carbon steel;
        a cylindrical side connecting said housing cover and said bottom, wherein said side is made of one of a group consisting of aluminum, copper, and carbon steel;
        at least four turnbuckles for securing said cover of said housing to said side of said housing; and
        an interior;
    a generator housed within said interior of said housing;
    an air blower in communication with said generator such that said air blower supplies cooling and combustion air to said generator;
    a battery bank housed within said interior of said housing;
    an inverter charger in electric communication with said battery bank such that said inverter charger charges said battery bank;
    an air inlet manifold comprising an air filter;
    an air outlet manifold, wherein exhaust air and cooling air leaving said generator are forced out of said housing through said air outlet manifold such that the exhaust air and cooling air are not introduced to said interior of said housing outside of said generator and said air outlet manifold, and wherein each of said air inlet manifold and said air outlet manifold are baffled and covered with a copper screen; and
    a control cable, a power outlet cable, and a propane supply line extending from said housing; and
    a propane supply in fluid communication with said generator of said power plant via said propane supply line.

3. The power plant kit as claimed in claim 2, further comprising at least one sacrificial anode disposed below said power plant.

4. The power plant kit as claimed in claim 2, wherein said housing cover of said housing of said self-contained power plant comprises at least one photovoltaic panel and said interior of said housing of said self-contained power plant comprises a solar charge controller.

* * * * *